United States Patent [19]
Matsumoto et al.

[11] Patent Number: 6,160,690
[45] Date of Patent: Dec. 12, 2000

[54] DISTRIBUTION CONTROL SYSTEM AND DISTRIBUTION CONTROL METHOD CAPABLE OF ISOLATING FAULT SECTION WITHOUT FAIL

[75] Inventors: Tadashi Matsumoto; Mitsuru Mitani, both of Tokyo, Japan

[73] Assignee: Mitsubishi Denki Kabushiki Kaisha, Tokyo, Japan

[21] Appl. No.: 09/290,184

[22] Filed: Apr. 13, 1999

[30] Foreign Application Priority Data

Oct. 30, 1998  [JP]  Japan .................................. 10-311197

[51] Int. Cl.⁷ ...................................................... H02H 3/00
[52] U.S. Cl. .................................. 361/62; 361/64; 361/67; 361/68
[58] Field of Search ..................... 361/62–68, 78

[56] References Cited

U.S. PATENT DOCUMENTS 5,341,268  8/1994  Ishiguro et al. ........................... 361/62
5,574,611  11/1996  Nishijima et al. ......................... 361/64
5,940,260  8/1999  Gelbien et al. ............................ 361/62
6,008,971  12/1999  Duba et al. ................................ 361/64

OTHER PUBLICATIONS

"Technical Specification", Taiwan Electric Power Public Corporation, Dec. 1994.

Primary Examiner—Michael J. Sherry
Attorney, Agent, or Firm—Leydig, Voit & Mayer, Ltd.

[57] ABSTRACT

A distribution control system that can isolate a fault section without fail, even if control of load break switches becomes impossible because of a communication error between a control center and a feeder terminal unit. If a communication error takes place between the control center and a particular feeder terminal unit, for example, feeder terminal units associated with the particular feeder terminal unit change the operation mode of their controlling load break switches from non-voltage unopened mode to non-voltage open mode.

14 Claims, 13 Drawing Sheets

FIG.6

| INFORMATION ENTRIES | PRESENCE/ABSENCE OF INFORMATION IN CONVENTIONAL SYSTEM | PRESENCE/ABSENCE OF INFORMATION IN PRESENT INVENTION | REMARKS |
|---|---|---|---|
| MONITORING OF CLOSE/OPEN STATE OF SWITCHES | PRESENT | PRESENT | |
| CONTROL OF CLOSE/OPEN OF SWITCHES | PRESENT | PRESENT | |
| MONITORING OF PRESENCE/ABSENCE OF VOLTAGE ON POWER SUPPLY SIDE OF SWITCHES | PRESENT | PRESENT | |
| MONITORING OF PRESENCE/ABSENCE OF VOLTAGE ON LOAD SIDE OF SWITCHES | PRESENT | PRESENT | |
| MONITORING OF OVER-CURRENT PASSING THROUGH SWITCHES | PRESENT | PRESENT | |
| MONITORING OF VOLTAGE AND PHASE ANGLE ON POWER SUPPLY SIDE AND LOAD SIDE OF SWITCHES | ABSENT | PRESENT | |
| MONITORING OF COMMUNICATION STATE | PRESENT | PRESENT | FEEDER TERMINAL UNITS MONITOR THE COMMUNICATION STATE |
| MONITORING OF NORMAL MODE (CLOSE/OPEN STATE) OF SWITCHES | PRESENT | PRESENT | |
| CONTROL OF NORMAL MODE (CLOSE/OPEN STATE) OF SWITCHES | ABSENT | PRESENT | |
| LATCH/UNLATCH CONTROL OF SWITCHES | | PRESENT | IN CASE OF COMMUNICATION ERROR, AUTOMATIC LATCH → UNLATCH CONTROL OF SWITCHES IS CARRIED OUT |

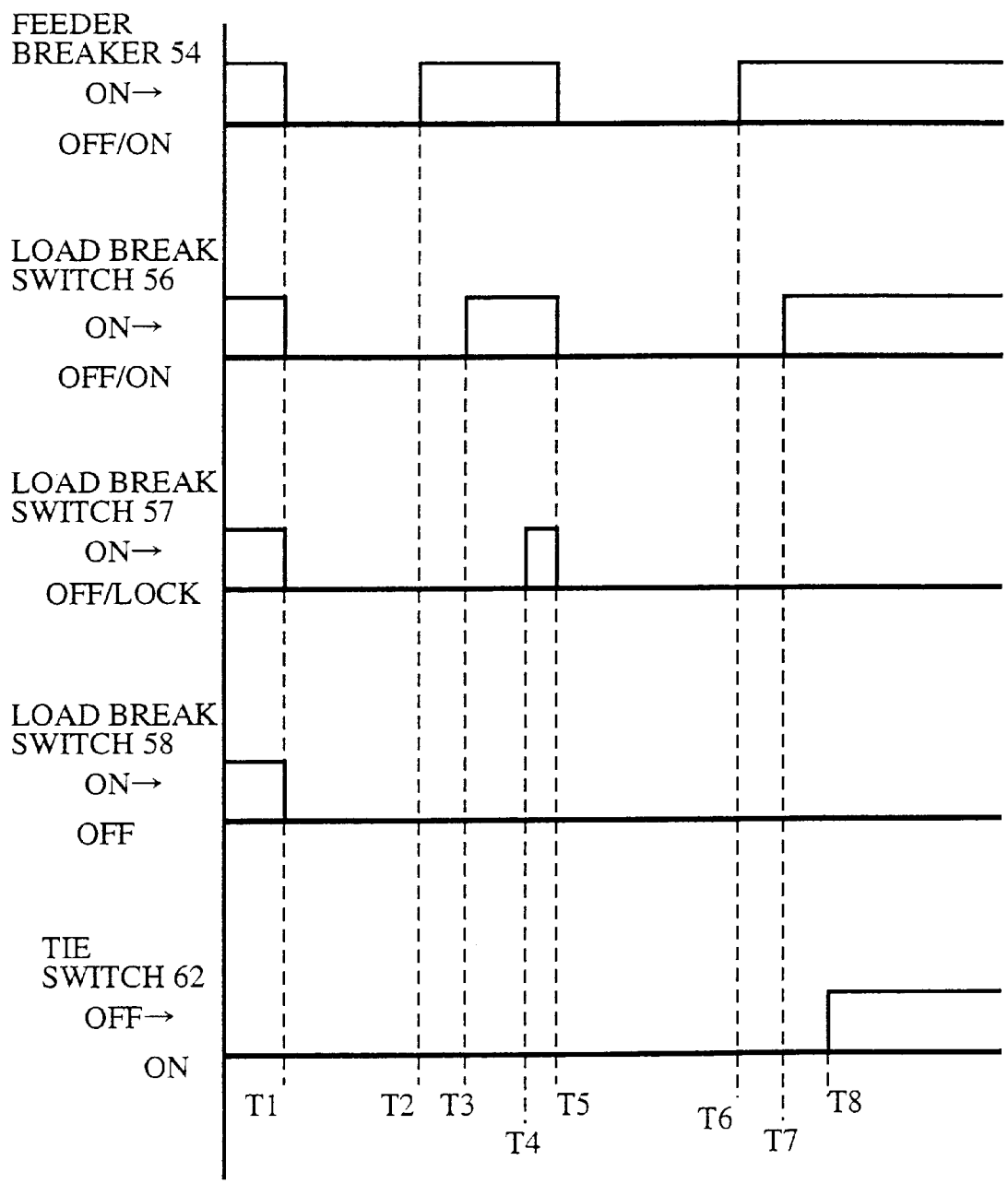

FIG.13 (PRIOR ART)

| INFORMATION ENTRIES | PRESENCE/ABSENCE OF INFORMATION IN CONVENTIONAL SYSTEM | REMARKS |
|---|---|---|
| MONITORING OF CLOSE/OPEN STATE OF SWITCHES | PRESENT | |
| CONTROL OF CLOSE/OPEN OF SWITCHES | PRESENT | |
| MONITORING OF PRESENCE/ ABSENCE OF VOLTAGE ON POWER SUPPLY SIDE OF SWITCHES | PRESENT | |
| MONITORING OF PRESENCE/ ABSENCE OF VOLTAGE ON LOAD SIDE OF SWITCHES | PRESENT | |
| MONITORING OF OVER-CURRENT PASSING THROUGH SWITCHES | PRESENT | |
| MONITORING OF VOLTAGE AND PHASE ANGLE ON POWER SUPPLY SIDE AND LOAD SIDE OF SWITCHES | PRESENT | |
| MONITORING OF NORMAL MODE (CLOSE/OPEN STATE) OF SWITCHES | PRESENT | |
| CONTROL OF NORMAL MODE (CLOSE/OPEN STATE) OF SWITCHES | PRESENT | |

DISTRIBUTION CONTROL SYSTEM AND DISTRIBUTION CONTROL METHOD CAPABLE OF ISOLATING FAULT SECTION WITHOUT FAIL

BACKGROUND OF THE INVENTION

1. Field of the Invention

The present invention relates to a distribution control system and a distribution control method for isolating a fault section when a fault takes place on a distribution line.

2. Description of Related Art

FIG. 8 is a system diagram showing a distribution system to which a conventional distribution control system is applied. In FIG. 8, reference symbols AS/S, BS/S, CS/S, DS/S and ES/S each designate a distribution substation; F1–F9 each designate a distribution line led out of the distribution substation AS/S; F10–F18 each designate a distribution line led out of the distribution substation BS/S; F19–F26 each designate a distribution line led out of the distribution substation CS/S; F27–F34 each designate a distribution line led out of the distribution substation DS/S; F35–F43 each designate a distribution line led out of the distribution substation ES/S; and LS1–LS18 each designate a tie switch for coupling two distribution lines.

Although not shown in FIG. 8, a plurality of load break switches are interposed in each distribution line.

FIG. 9 is a block diagram showing a conventional distribution control system, in which the reference numeral 1 designates a distribution transformer of the distribution substation AS/S; 2 designates a secondary main breaker of the distribution transformer 1; and 3 designates a secondary main bus of the distribution transformer 1, from which the distribution lines F1 and F2 are drawn out.

Reference numerals 4 and 5 each designate a distribution feeder breaker; 6–11 each designate a no-voltage unopened mode load break switch; 12 designates a tie switch for coupling the distribution lines F1 and F2; 13–19 each designate a feeder terminal unit for monitoring a fault current or the like passing through the load break switches 6–11 and tie switch 12, for notifying a substation remote terminal unit 20 of presence/absence information about the fault current, and for turning on and off the load break switches 6–11 and tie switch 12 in response to a control signal from the substation remote terminal unit 20; and 20 designates the substation remote terminal unit for transferring to a control center 21 the presence/absence information about the fault current supplied from the feeder terminal units 13–19, and for transferring to the feeder terminal units 13–19 the control signal supplied from the control center 21.

The reference numeral 21 designates the control center for managing the distribution of the distribution substation AS/S; 22 designates an information collecting unit for carrying out transmission and reception of information; 23 designates a computer system for identifying a fault section from the presence/absence information supplied thereto, and for producing a control signal commanding opening of the load break switches at both ends of the fault section; and A1–A5, B1–B3 and C each designate a communication line.

FIG. 11 is a block diagram showing an internal arrangement of the load break switch and feeder terminal unit, and FIG. 12 is a diagram showing a structure of the load break switch. In FIG. 11, the reference numeral 31 designates a contact maker; 32 designates an operation rod for closing or opening the contact maker 31; 33 designates an actuator of the load break switch; 34 designates a current transformer for detecting a current; 35 and 36 each designate a control transformer for detecting a voltage; 37 designates a voltage/phase angle detector for detecting the voltage and phase on the distribution line; 38 designates a current detector for detecting a current passing through the load break switch; 39 designates a controller for monitoring an operation state of the actuator of the switch 33 and the current passing through the load break switch, and for controlling the actuator of the switch 33 in response to the control signal from the substation remote terminal unit 20; 40 designates a communication circuit for exchanging information with the substation remote terminal unit 20; 41 designates a battery for supplying power to component circuits of the feeder terminal unit in case of outage of the distribution line; and 42 designates a branch box for connecting the communication circuit 40 of the feeder terminal unit to a communication line.

In FIG. 12, the reference numeral 33a designates a movable magnetic pole attached to the operation rod 32; 33b designates a magnetic coil for driving the movable magnetic pole 33a; 33c designates a switch; 33d designates a controller for controlling the switch 33c; 33e designates a power supply of the magnetic coil 33b; 33f designates a movable rod coupled to the movable magnetic pole 33a for latching; 33g designates a latch holder; 33h designates a coil spring for opening the contact maker 31; 33i designates a spring bearing; 33j designates a coil spring for holding the latched state of the contact maker 31; 33k designates a spring bearing; 33l designates a latch control rod; 33m designates a latch operation handle; 33n designates a movable fulcrum; 33p designates a fixed fulcrum; and 33q designates a point on the latch operation handle 33m which is manually operated from the right to the left to unlatch the latch holder 33g from the movable rod 33f so that the contact maker 31 is opened by the force of the coil spring 33h.

Next, the operation of the conventional system will be described.

When controlling the distribution system of the distribution substation AS/S, the substation remote terminal unit 20 regularly transmits to the feeder terminal units 13–19 an information transmission request through the communication lines A4 and A5 so as to collect information about the load break switches 6–11 and tie switch 12 (including information as shown in FIG. 13 as well as the presence/absence information of the fault current passing through the load break switches).

Since the feeder terminal units 13–19 always collect the information about the load break switches 6–11 and tie switch 12, they send the information back to the substation remote terminal unit 20 through the communication lines A4 and A5 in response to the information transmission request from the substation remote terminal unit 20.

The information about the load break switches 6–11 and tie switch 12 thus collected by the substation remote terminal unit 20 is transferred to the control center 21, in which the computer system 23 identifies the fault section from the information about the load break switches 6–11 and tie switch 12 if a distribution line fault takes place.

Identifying the fault section, the computer system 23 supplies the substation remote terminal unit 20 with a control signal that commands opening of the load break switches at both ends of the fault section, thereby commanding the feeder terminal units managing the load break switches at both ends of the fault section to open the load break switches, and trying to isolate the fault section. To provide a precise description of a series of steps involved in this operation, it is assumed in the following that a distribution line fault takes place in the section F1–3 of the distribution line F1.

If the distribution line fault takes place in the section F1–3 of the distribution line F1 at time T1 as shown in FIG. 10, a protective relay included in the feeder breaker 4 operates so that the feeder breaker 4 trips and the distribution line F1 is shut down.

However, since the load break switches 6–8 are a non-voltage unopened mode switch, they do not open immediately even if the distribution line F1 is shut down to a non-voltage state by the distribution line fault, thereby maintaining the closed state.

Although the feeder breaker 4 automatically closes again by itself after about 60 sec. has passed since the distribution line F1 was shut down (time T4), the information about the load break switches 6–8 is transmitted to the computer system 23 in the control center 21 before that.

Since the information on the shut down of the feeder breaker 4 due to the distribution line fault is also transferred to the computer system 23 in the control center 21, the computer system 23 can recognize the occurrence of the distribution line fault.

Thus, the computer system 23 identifies the fault section from the information about the load break switches 6–8. When the distribution line fault takes place in the section F1–3, the fault current flows through the load break switches 6 and 7, but not through the load break switch 8. Using this characteristic, the computer system 23 identifies the fault section from the presence/absence information on the fault current included in the information about the load break switches 6–8.

Identifying the fault section in this way, the computer system 23 supplies the substation remote terminal unit 20 with the control signal commanding opening of the load break switches 7 and 8 at time T2 to isolate the fault section at opposite ends of the section F1–3.

Receiving the control signal commanding opening of the load break switches 7 and 8, the substation remote terminal unit 20 transfers the control signal to the feeder terminal units 14 and 15 which opens the load break switches 7 and 8.

After isolating the fault section, the computer system 23 supplies the substation remote terminal unit 20 with the control signal commanding closing of the tie switch 12 at time T3 to recover the outage of the healthy sections (although the section F1–2 is immediately charged when the feeder breaker 4 closes again at time T4, because the load break switch 6 maintains the closed state, this is not enough for the section F1–4 to be charged because the load break switch 8 is opened).

Receiving the control signal commanding closing of the tie switch 12, the substation remote terminal unit 20 transfers the control signal to the feeder terminal unit 19 which closes the tie switch 12.

After that, when the feeder breaker 4 closes again at time T4, the distribution line F1 is charged except for the fault section F1–3.

With the foregoing configuration, the conventional distribution control system can positively isolate the fault section even if a distribution line fault takes place in the distribution line F1 as long as the information about the load break switches 6–11 is transmitted to the control center 21 and the control signal of the control center 21 is transferred to the feeder terminal units 13–15 without fail. However, if a communication failure occurs between the control center 21 and the feeder terminal units 13–15, control of the load break switches 6–8 becomes impossible, which presents a problem of being unable to isolate the fault section.

SUMMARY OF THE INVENTION

The present invention is implemented to solve the foregoing problem. It is therefore an object of the present invention to provide a distribution control system capable of isolating a fault section without fail even if a communication failure takes place.

According to a first aspect of the present invention, there is provided a distribution control system comprising: a plurality of switches interposed in a distribution line; a plurality of arbitrators for monitoring a fault current flowing through the plurality of switches, for providing presence/absence information about the fault current, and for turning on and off the switches in response to a control signal; a managing unit for identifying a fault section from the presence/absence information of the fault current, and for producing the control signal commanding to open the switches interposed at both ends of the fault section; and means for detecting a communication fault taking place between any one of the plurality of arbitrators and the managing unit, wherein each of the plurality of arbitrators changes an operation mode of one of the plurality of switches from a no-voltage unopened mode to a no-voltage open mode if the communication fault is detected.

Here, each one of the plurality of arbitrators may change, if information exchange with the managing unit becomes impossible, the operation mode of an associated one of the plurality of switches from the no-voltage unopened mode to the no-voltage open mode, and the managing unit may supply, if the information exchange with any one of the plurality of arbitrators becomes impossible, remaining ones of the plurality of arbitrators with a switching command to switch the operation mode of their associated ones of the plurality of switches from no-voltage unopened mode to no-voltage open mode.

Each one of the plurality of arbitrators may perform, when it changes the operation mode of the associated one of the plurality of switches from the no-voltage unopened mode to the no-voltage open mode, time limited sequential shift control of the associated one of the plurality of switches to place at least one of the switches associated with the fault section in a close lock state.

The managing unit may comprise a substation remote terminal unit for carrying out information exchange with each one of the plurality of arbitrators, and a control center for supplying the substation remote terminal unit with a command, and the substation remote terminal unit may supply, if it detects a communication error between it and the control center, all of the plurality of arbitrators with the switching command to switch the operation mode of their associated ones of the plurality of switches from the no-voltage unopened mode to the no-voltage open mode.

The managing unit may comprise a substation remote terminal unit for carrying out information exchange with each one of the plurality of arbitrators, and a control center for supplying the substation remote terminal unit with a command, and the control center may notify, when it detects a communication fault between it and the substation remote terminal unit, an operator of an interruption of distribution control of the control center.

The managing unit may supply the switching command to an arbitrator connected to a communication line separate from a communication line connected to the arbitrator that cannot exchange the information.

Each of the switches interposed in the distribution line may be a switch that changes its operation mode from the no-voltage unopened mode to the no-voltage open mode in response to a mode switching request from ore of the plurality of arbitrators.

According to a second aspect of the present invention, there is provided a distribution control method comprising the steps of: monitoring, by a plurality of feeder terminal units, a fault current passing through a plurality of switches interposed in a distribution line; providing a managing center with presence/absence information about the fault current; providing, when the managing center identifies a fault section from the presence/absence information about the fault current, feeder terminal units at both ends of the fault section with a control signal commanding to open the switches at both ends of the fault section; and changing, by each of the plurality of feeder terminal units, an operation mode of each of the plurality of switches from a no-voltage unopened mode to a no-voltage open mode if a communication fault is detected between any one of the plurality of feeder terminal units and the managing center.

Here, the step of changing an operation mode of each of the plurality of switches may comprise the steps of: changing, by each of the plurality of feeder terminal units, if information exchange between it and the managing center becomes impossible, the operation mode of an associated one of the plurality of switches from the no-voltage unopened mode to the no-voltage open mode; and supplying, by the control center, if the information exchange between it and any one of the plurality of feeder terminal units becomes impossible, remaining ones of the plurality of feeder terminal units with a switching command to switch the operation mode of their associated ones of the plurality of switches from no-voltage unopened mode to no-voltage open mode.

The step of changing may comprise the step of performing, by each one of the plurality of feeder terminal units, when it changes the operation mode of the associated one of the plurality of switches from the no-voltage unopened mode to the no-voltage open mode, time limited sequential shift control of the associated one of the plurality of switches to place at least one of the switches associated with the fault section in a close lock state.

The step of changing may comprise, when the managing center comprises a substation remote terminal unit for carrying out information exchange with each one of the plurality of feeder terminal units, and a control center for supplying the substation remote terminal unit with a command, the step of supplying, from the substation remote terminal unit to all of the plurality of feeder terminal units, if the substation remote terminal unit detects a communication error between it and the control center, a switching command to switch the operation mode of their associated ones of the plurality of switches from the no-voltage unopened mode to the no-voltage open mode.

The distribution control method may further comprise, when the managing center comprises a substation remote terminal unit for carrying out information exchange with each one of the plurality of feeder terminal units, and a control center for supplying the substation remote terminal unit with a command, the step of providing, an operator, when the control center detects a communication fault between it and the substation remote terminal unit, with information about an interruption of distribution control of the control center.

The distribution control method may further comprise the step of supplying the switching command to feeder terminal units that are connected to a communication line separate from a communication line connected to the feeder terminal unit that cannot exchange the information.

Each of the switches interposed in the distribution line may be a switch that changes its operation mode from the no-voltage unopened mode to the no-voltage open mode in response to a mode switching request from one of the plurality of feeder terminal units.

BRIEF DESCRIPTION OF THE DRAWINGS

FIG. 6 is a table showing information about the load break switch and a tie switch of the embodiment 1;

FIG. 7 is a time chart illustrating open and close states of the load break switches and the like of the embodiment 1;

FIG. 10 is a time chart illustrating open and closed states of conventional load break switches and the like;

FIG. 13 is a table showing information about the conventional load break switch and a tie switch.

DETAILED DESCRIPTION OF THE PREFERRED EMBODIMENTS

The invention will now be described with reference to the accompanying drawings.

EMBODIMENT 1

Figure 1:
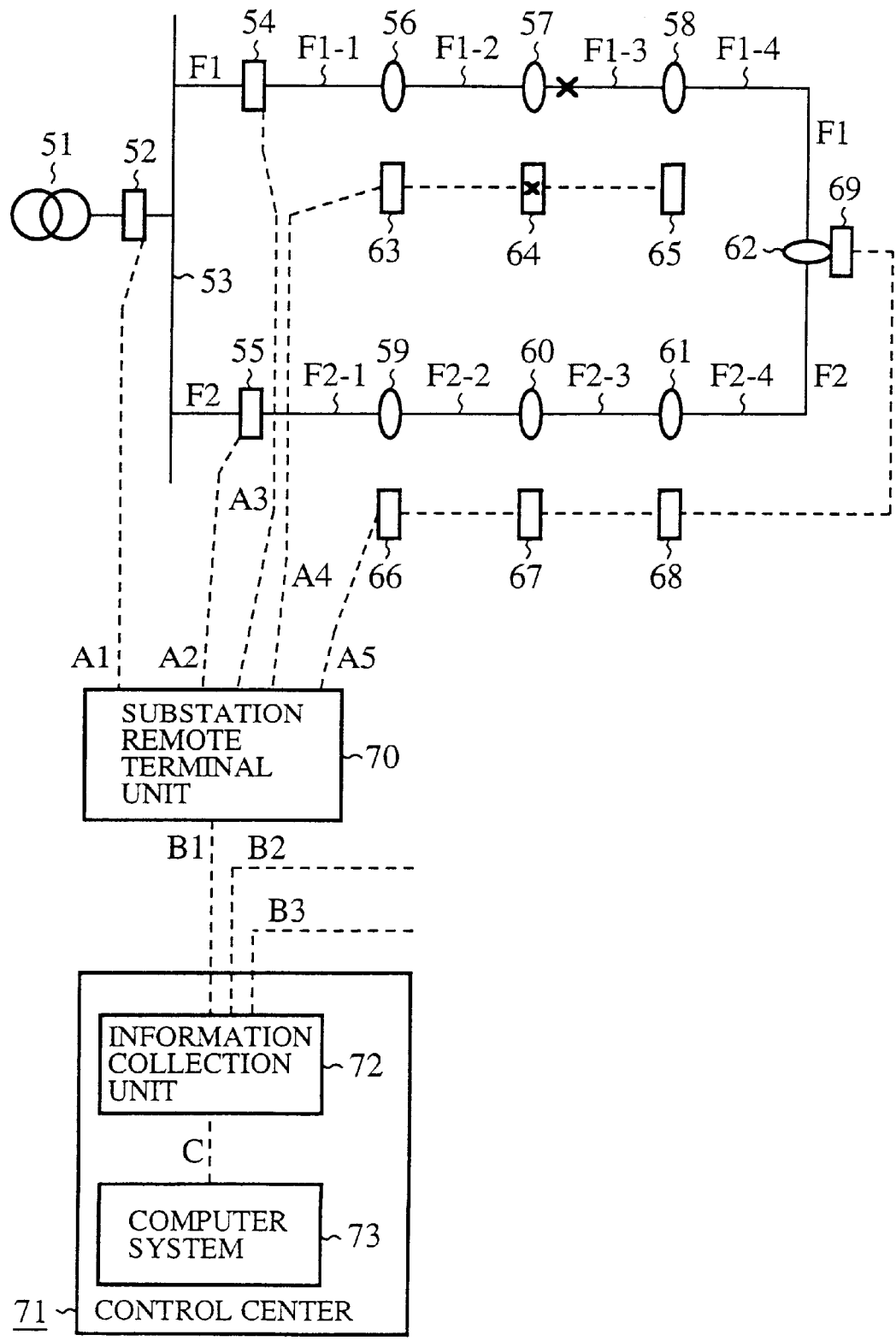
FIG. 1 is a block diagram showing an embodiment 1 of a distribution control system in accordance with the present invention.

FIG. 1 is a block diagram showing an embodiment 1 of a distribution control system in accordance with the present invention. In FIG. 1, the reference numeral 51 designates a distribution transformer of the distribution substation AS/S; 52 designates a secondary main breaker of the distribution transformer 51; and 53 designates a secondary main bus of the distribution transformer 51, from which the distribution lines F1 and F2 are drawn out.

Reference numerals 54 and 55 each designate a distribution feeder breaker; 56–61 each designate a load break switch that changes, while operating in a non-voltage unopened mode, their operation mode from the no-voltage unopened mode to a no-voltage open mode in response to a changing request from feeder terminal units 63–68; 62 designates a tie switch for coupling the distribution lines F1 and F2; and 63–69 each designate a feeder terminal unit for monitoring a fault current or the like passing through the load break switches 56–61 and tie switch 62, for notifying a substation remote terminal unit 70 of presence/absence information about the fault current, and for turning on and off the load break switches 56–61 and tie switch 62 in response to a control signal fed from the substation remote terminal unit 70. The feeder terminal units 63–68 outputs the request for changing the operation mode of the load break switches 56–61 from the no-voltage unopened mode to the no-voltage open mode if a communication failure takes place between the substation remote terminal unit 70 and the feeder terminal units 63–68.

The reference numeral 70 designates the substation remote terminal unit for transferring to a control center 71 the presence/absence information about the fault current supplied from the feeder terminal units 63–69, and for transferring to the feeder terminal units 63–69 the control signal supplied from the control center 71; 71 designates the control center for managing the distribution of the distribution substation AS/S; 72 designates an information collecting unit for carrying out transmission and reception of information; 73 designates a computer system for identifying a fault section from the presence/absence information supplied thereto, and for producing a control signal commanding opening of the load break switches at both ends of the fault section; and A1–A5, B1–B3 and C each designate a communication line.

Figure 4:
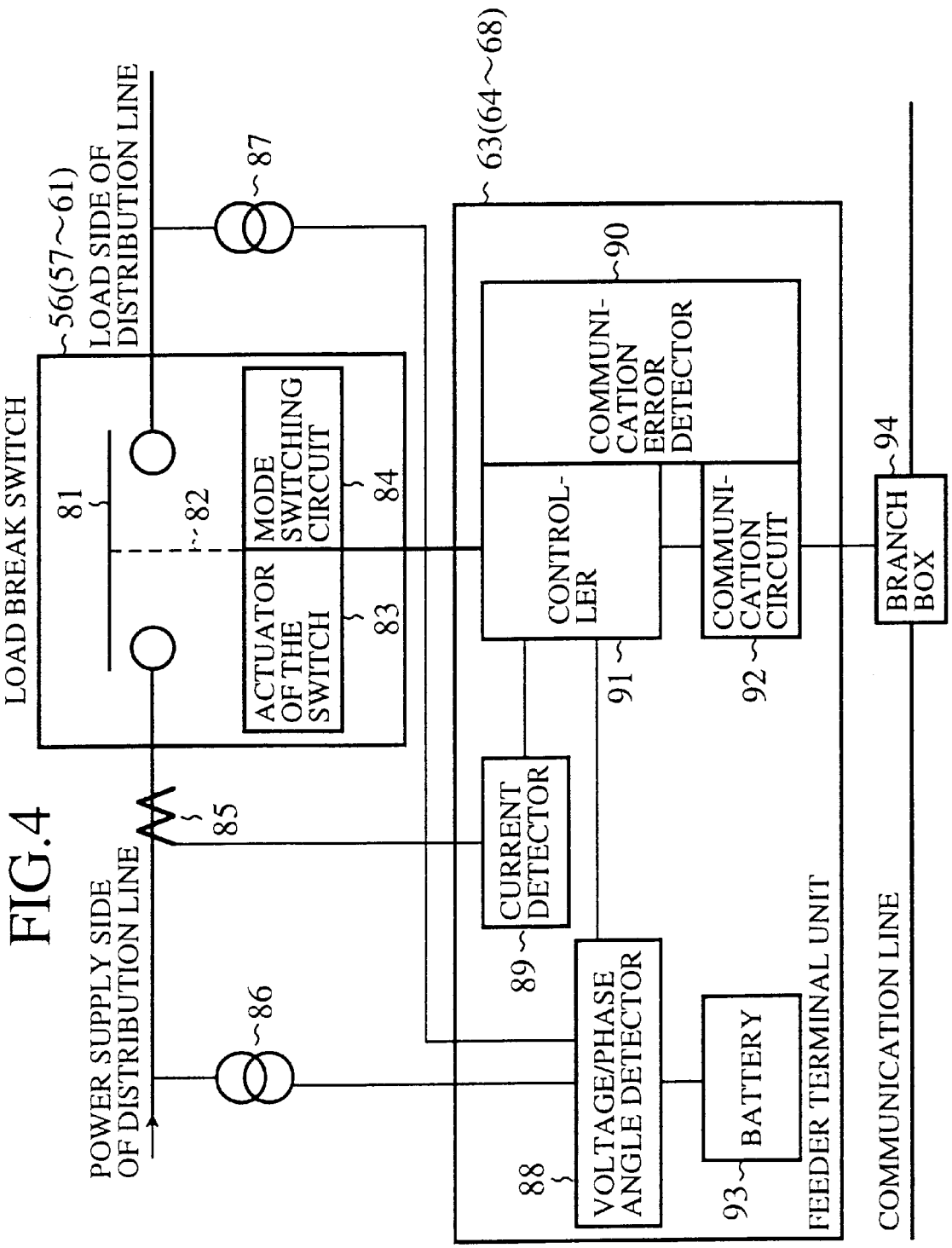
FIG. 4 is a block diagram showing an internal structure of a load break switch and a feeder terminal unit of the embodiment 1.
Figure 5:
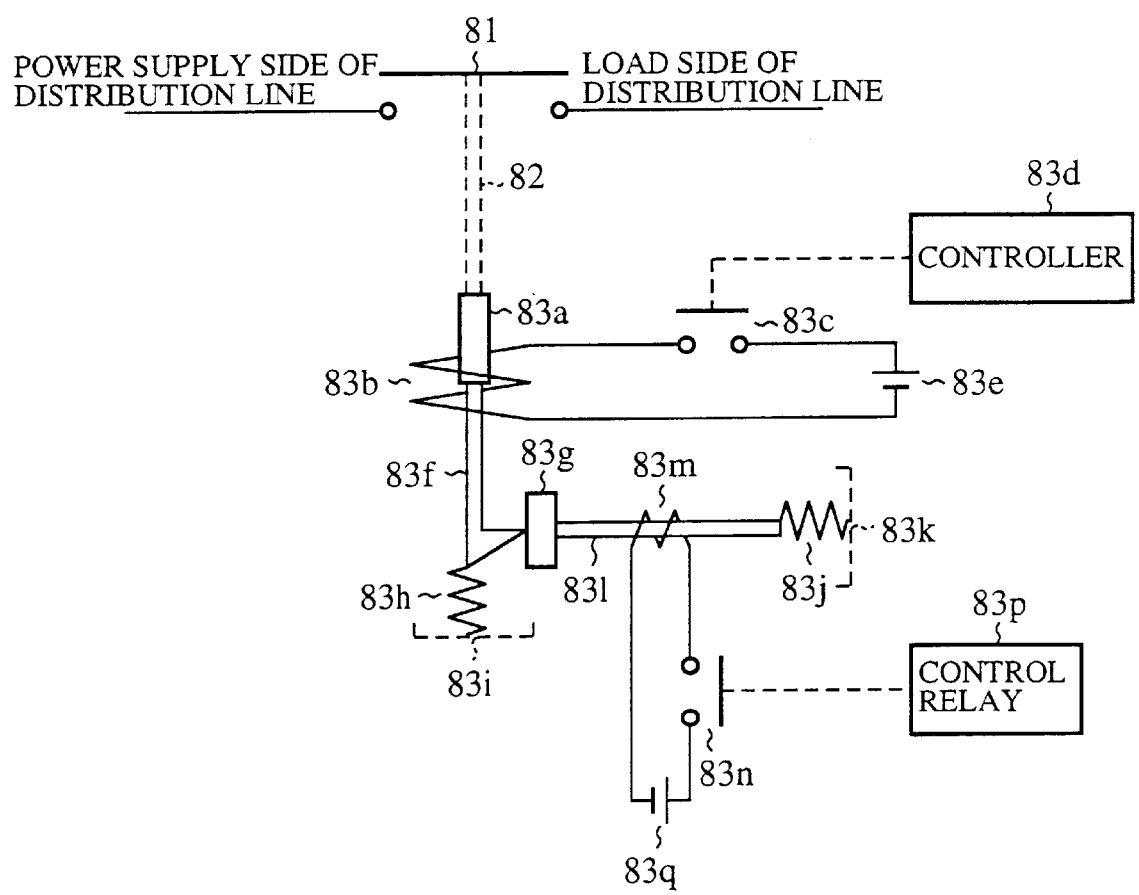
FIG. 5 is a diagram showing a structure of the load break switch of the embodiment 1.
Figure 8:
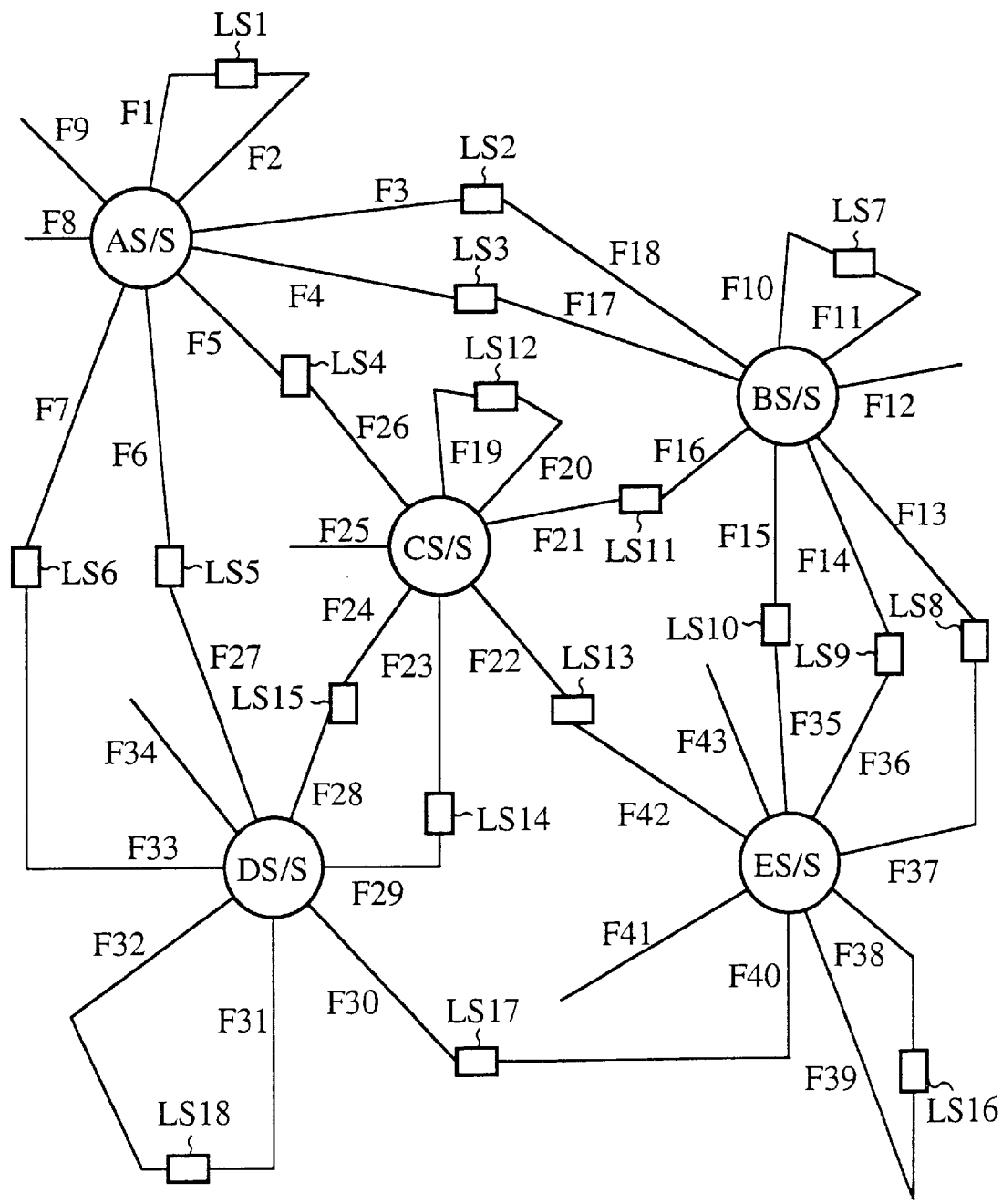
FIG. 8 is a system diagram showing a distribution system to which a conventional distribution control system is applied.
Figure 9:
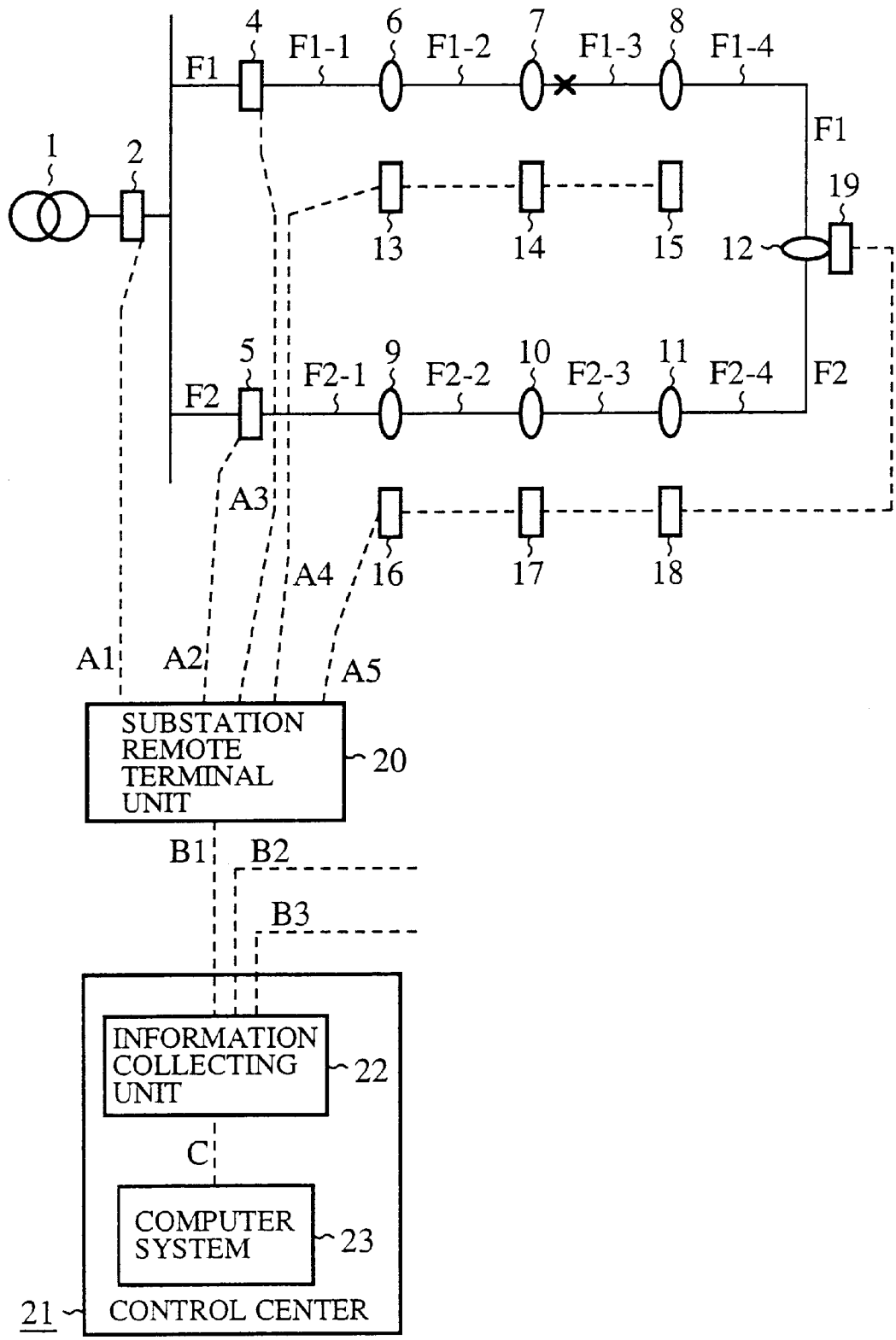
FIG. 9 is a block diagram showing a conventional distribution control system.
Figure 10:
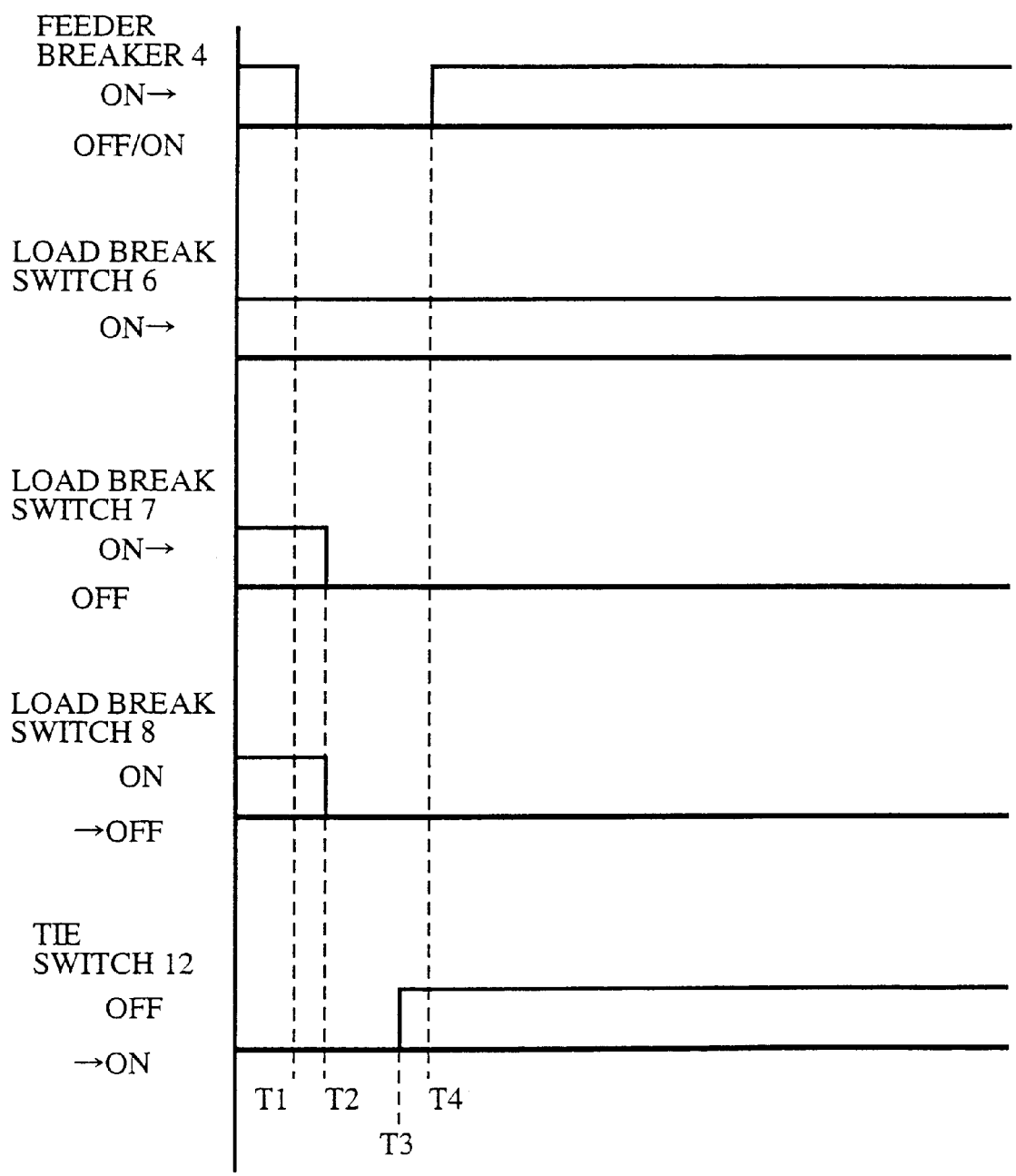
Figure 11:
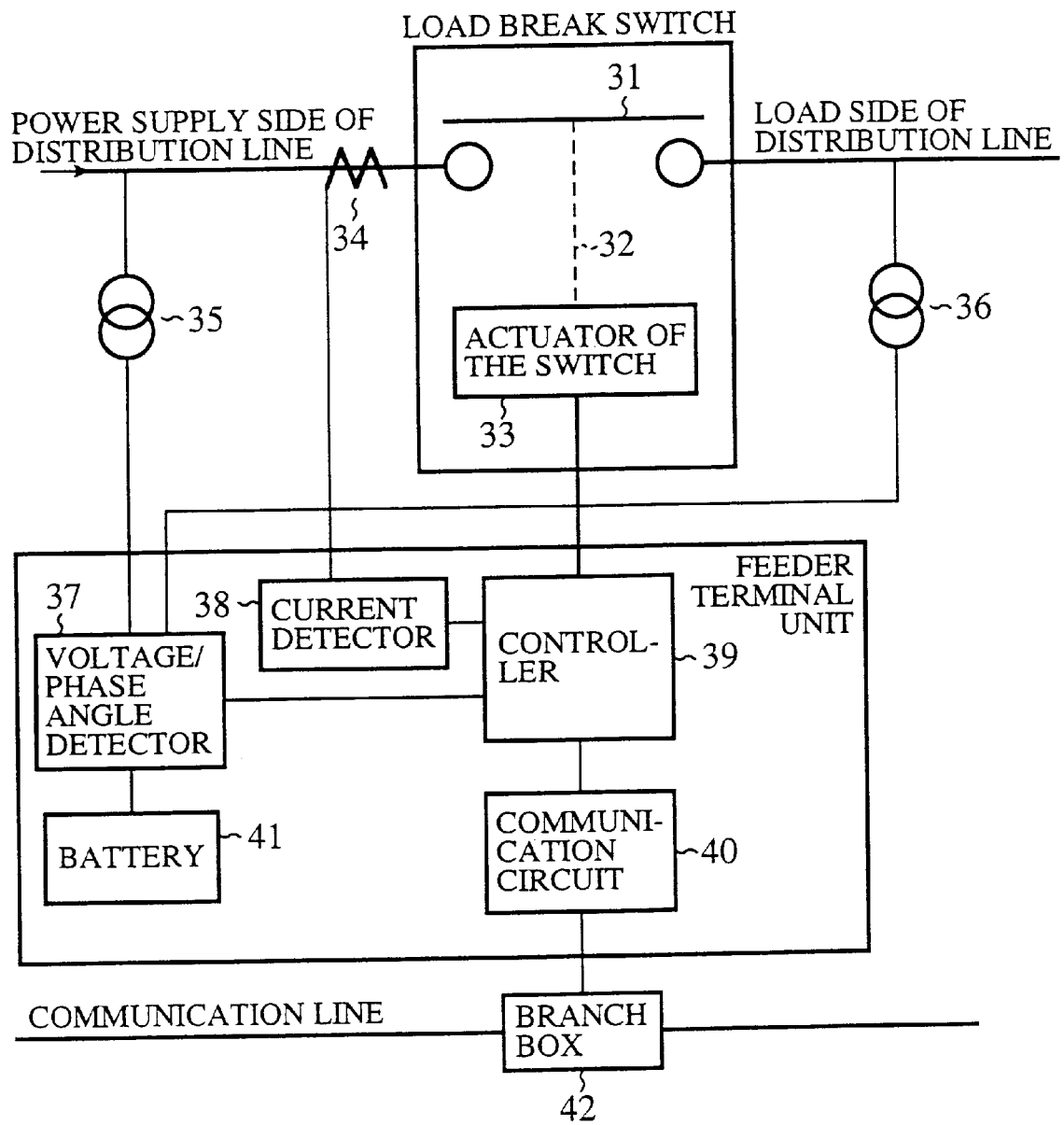
FIG. 11 is a block diagram showing an internal structure of a conventional load break switch and feeder terminal unit.
Figure 12:
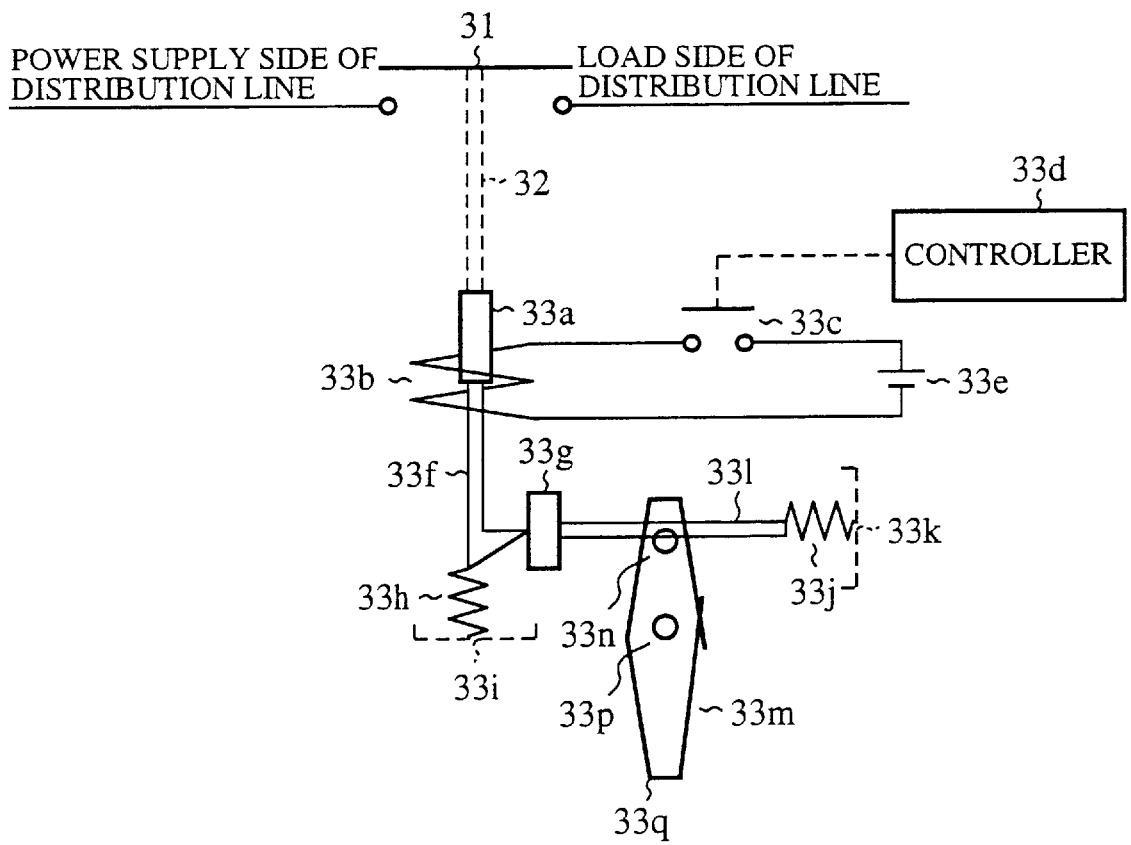
FIG. 12 is a diagram showing a structure of the conventional load break switch.

FIG. 4 is a block diagram showing an internal arrangement of the load break switch and feeder terminal unit, and FIG. 5 is a diagram showing a structure of the load break switch. In FIG. 4, the reference numeral 81 designates a contact maker; 82 designates an operation rod for closing or opening the contact maker 81; 83 designates an actuator of the load break switch; 84 designates a mode switching circuit for switching the operation mode of the load break switch; 85 designates a current transformer for detecting a current; 86 and 87 each designate a control transformer for detecting a voltage; 88 designates a voltage/phase angle detector for detecting the voltage and phase on each distribution line; 89 designates a current detector for detecting a current passing through the load break switch; 90 designates a communication error detector for detecting a communication error by monitoring a carrier state of the communication line; 91 designates a controller for monitoring an operation state of the actuator of the switch 83 and the current passing through the load break switch, and for controlling the actuator of the switch 83 in response to the control signal from the substation remote terminal unit 70; 92 designates a communication circuit for exchanging information with the substation remote terminal unit 70; 93 designates a battery for supplying power to component circuits of the feeder terminal unit in case of outage of the distribution line; and 94 designates a branch box for connecting the communication circuit 92 of the feeder terminal unit to the communication line.

In FIG. 5, the reference numeral 83*a* designates a movable magnetic pole attached to the operation rod 82; 83*b* designates a magnetic coil for driving the movable magnetic pole 83*a*; 83*c* designates a switch; 83*d* designates a controller for controlling the switch 83*c*; 83*e* designates a power supply of the magnetic coil 83*b*; 83*f* designates a movable rod coupled to the movable magnetic pole 83*a* for latching; 83*g* designates a latch holder; 83*h* designates a coil spring for opening the contact maker 81; 83*i* designates a spring bearing; 83*j* designates a coil spring for holding the latched state of the contact maker 81; 83*k* designates a spring bearing; 83*l* designates a latch release rod; 83*m* designates a magnetic coil for releasing the latch; 83*n* designates a switch; 83*p* designates a control relay for controlling the switch 83*n* in response to the communication error detected by the communication error detector 90; and 83*q* designates a power supply of the magnetic coil 83*m*.

Figure 2:
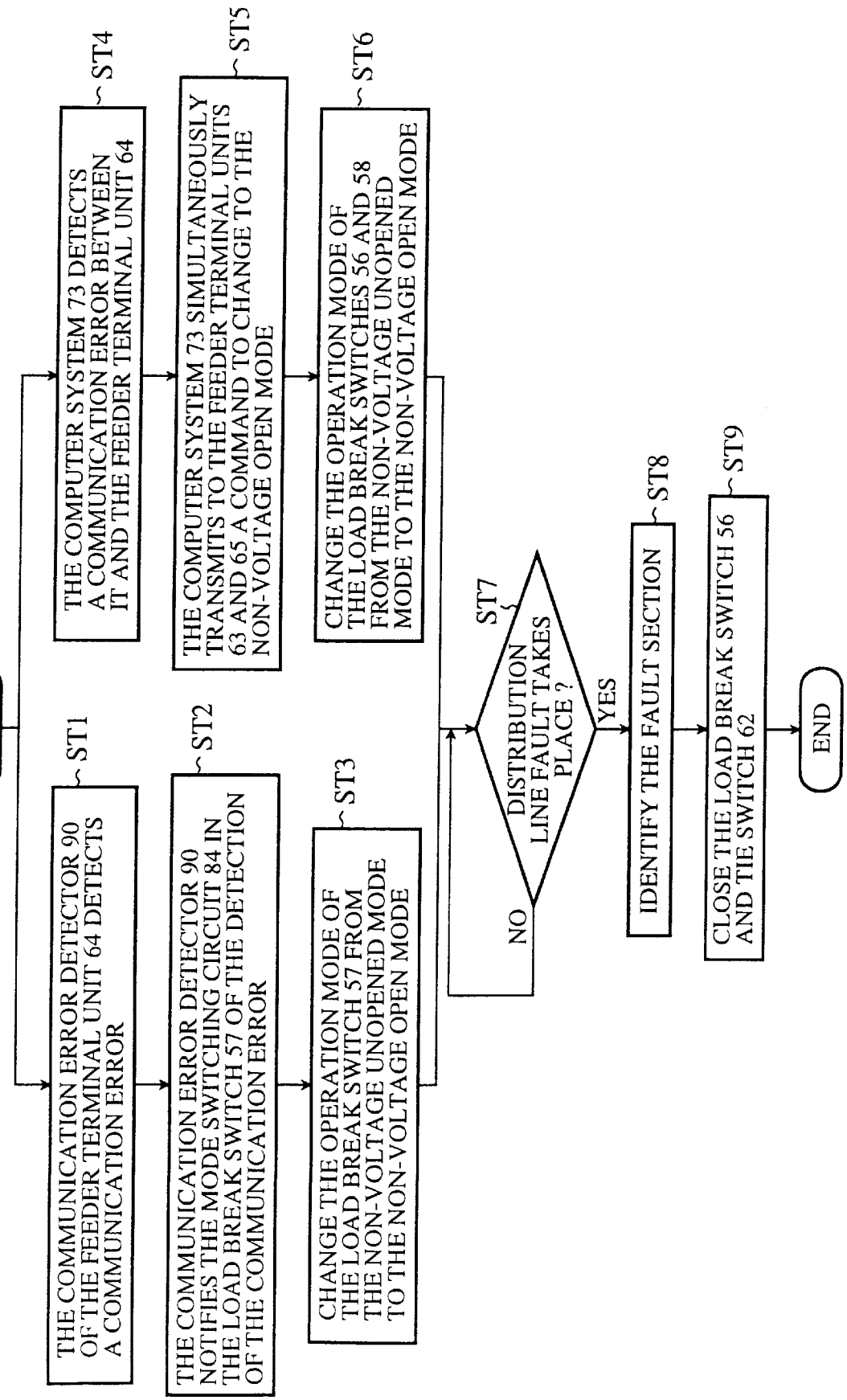
FIG. 2 is a flowchart illustrating the distribution control method of the embodiment 1.

Next, the operation of the present embodiment 1 in accordance with the present invention will be described with reference to FIG. 2 illustrating a flow chart of the distribution control method of the embodiment 1.

When controlling the distribution system of the distribution substation AS/S, the substation remote terminal unit 70 regularly transmits to the feeder terminal units 63–69 an information transmission request through the communication lines A4 and A5 so as to collect information about the load break switches 56–61 and tie switch 62 (including information as shown in FIG. 6 as well as the presence/absence information of the fault current passing through the load break switches).

Since the feeder terminal units 63–69 always collect the information about the load break switches 56–61 and tie switch 62, they send the information back to the substation remote terminal unit 70 through the communication lines A4 and A5 in response to the information transmission request from the substation remote terminal unit 70.

The information about the load break switches 56–61 and tie switch 62 thus collected by the substation remote terminal unit 70 is transferred to the control center 71, in which the computer system 73 identifies the fault section from the information about the load break switches 56–61 and tie switch 62 if a distribution line fault takes place.

Incidentally, since the information on the shut down of the feeder breaker 54 due to the distribution line fault is also transferred to the computer system 73 in the control center 71, the computer system 73 can recognize the occurrence of the distribution line fault.

Identifying the fault section, the computer system 73 supplies the substation remote terminal unit 70 with a control signal that commands it to open the load break switches at both ends of the fault section, thereby trying to isolate the fault section as in the conventional system. However, if a communication error takes place between the control center 71 and feeder terminal units 63–68, the load break switches 56–61 becomes uncontrollable, presenting the problem of being unable to isolate the fault section.

In view of this, although the control center 71 controls, in the present embodiment 1 as in the conventional system, the load break switches 56–61 through the feeder terminal units 63–68, as long as the information exchange is carried out normally between the control center 71 and the feeder terminal units 63–68, if a communication error occurs between the feeder terminal unit 64 and substation remote terminal unit 70, for example, the control center 71 changes the operation mode of the feeder terminal units 63–65 from the non-voltage unopened mode to the non-voltage open mode, thereby trying to automatically isolate the fault section.

Here, the non-voltage unopened mode is one that holds the closed state of the load break switch until an open request is supplied from the feeder terminal unit even if the distribution line becomes the non-voltage state, whereas the non-voltage open mode is one that opens the load break switch immediately when the distribution line becomes the non-voltage state, independently of the open request supplied from the feeder terminal unit.

More specifically, if the feeder terminal unit 64 cannot receive the transmission request sent from the substation remote terminal unit 70 because of a break or contact failure in the forward line of the communication line A4, the communication error detector 90 in the feeder terminal unit 64 detects the communication error at step ST1, and notifies the mode switching circuit 84 in the load break switch 57 of the communication error at step ST2.

Recognizing the communication error of the feeder terminal unit 64, the mode switching circuit 84 of the load break switch 57 changes the operation mode of the load break switch 57 from the non-voltage unopened mode to the non-voltage open mode at step ST3.

On the other hand, the computer system 73 in the control center 71 recognizes the communication error between it and the feeder terminal unit 64 at step ST4 if it cannot receive from the feeder terminal unit 64 the information about the load break switch 57 corresponding to the information transmission request, and sends to the feeder terminal units 63 and 65, simultaneously, at step ST5 a changing command to change the operation mode of all the load break switches, except for the load break switch 57, to the non-voltage opened mode.

Thus, the operation mode of the load break switches 56 and 58 is changed to the non-voltage opened mode at step ST6. After that, if a distribution line fault takes place in the section F1–3 of the distribution line F1, the fault section is isolated as follows.

Figure 3:
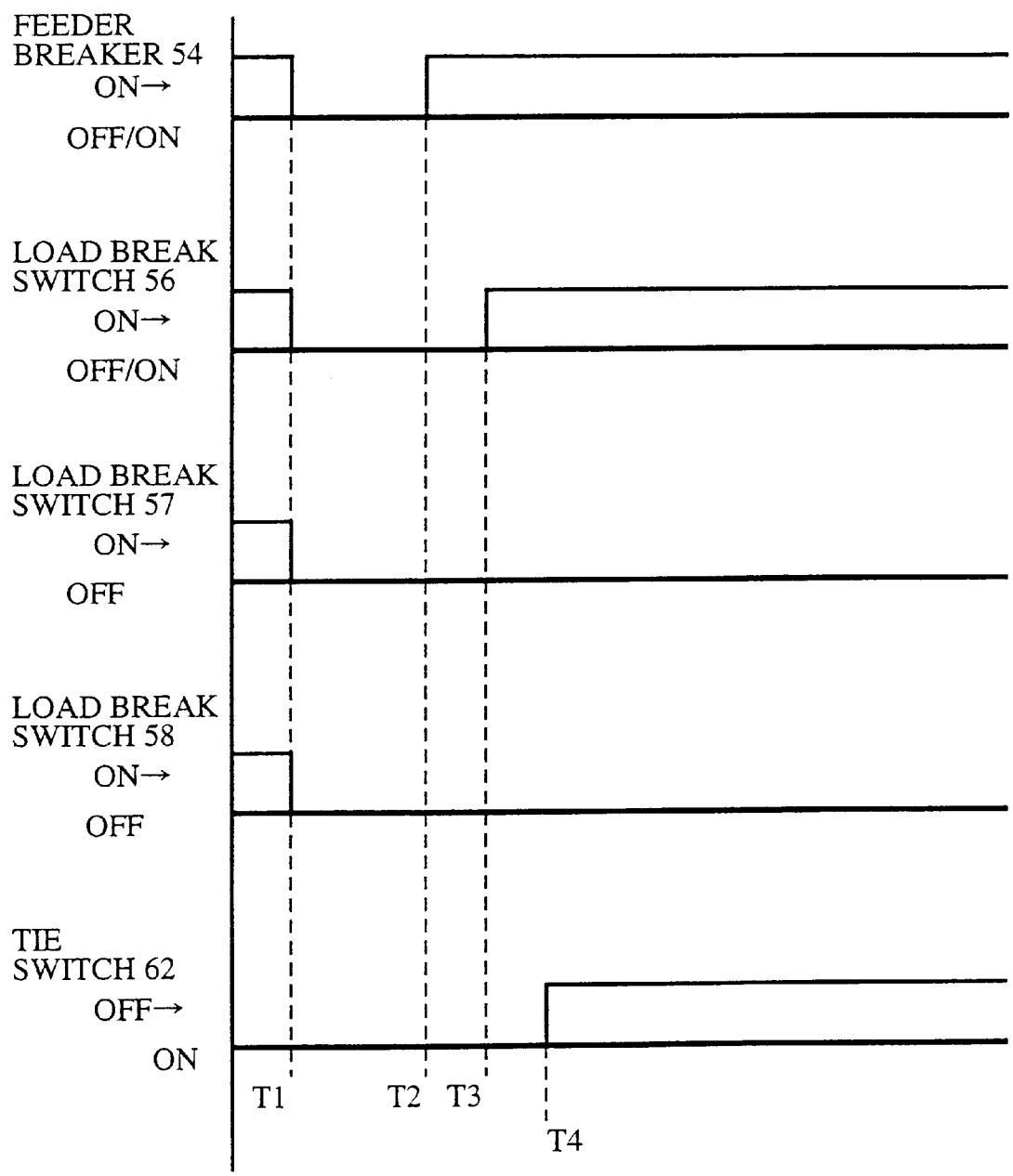
FIG. 3 is a time chart illustrating open and closed states of load break switches and the like of the embodiment 1.

As shown in FIG. 3, if the distribution line fault takes place in the section F1–3 of the distribution line F1 at time T1 at step ST7, a protective relay included in the feeder breaker 54 operates so that the feeder breaker 54 trips and the distribution line F1 is shut down.

Since the load break switches 56–58 have been changed to the non-voltage opened mode, they immediately change their operation mode to the open mode in response to the shut down of the distribution line F1.

On the other hand, the computer system 73 in the control center 71 carries out the identification processing of the fault section at step ST8 if the feeder breaker 54 breaks owing to the distribution line fault. If the distribution line fault takes place in the section F1–3, the fault current flows through the load break switch 56, but not through the load break switch 58. Using this characteristic, the computer system 73 recognizes that the distribution line fault takes place in the section F1–3, when it receives the presence/absence information on the fault current that the fault current flows through the load break switch 56, but not through the load break switch 58. (Thus, the distribution line fault in the section F1–3 can be identified without receiving the information about the load break switch 57).

Identifying the fault section in this way, the computer system 73 closes the feeder breaker 54 again at time T2, followed by supplying the substation remote terminal unit 70 with the control signal commanding closing of the load break switch 56 at time T3. Then, with the control signal commanding closing of the tie switch 62 at time T4, the outage of the healthy sections is recovered and only the fault section is isolated.

Receiving the control signals commanding closing of the load break switch 56 and tie switch 62, the substation remote terminal unit 70 transfers the control signal to the feeder terminal units 63 and 69 which sequentially close the load break switch 56 and tie switch 62, respectively, at step ST9.

Thus, the healthy sections F1–2 and F1–4 are recovered, and only the fault section F1–3 is isolated.

As described above, the present embodiment 1 is configured such that if a communication error takes place between the feeder terminal unit 64 and control center 71, for example, the feeder terminal units 63–65 change the operation mode of the load break switches 56–58 from the non-voltage unopened mode to non-voltage open mode. This offers an advantage of being able to isolate the fault section without fail even if the communication error occurs.

The present embodiment 1 is described above under the assumption that the communication error takes place at a feeder terminal unit located on the power supply side with respect to the fault section. If a communication error occurs at a feeder terminal unit located on the load side with respect to the fault section, it cannot identify the fault section.

In such a case, the fault section can be identified by transmitting power as a trial by closing the tie switch 62. However, since the power may be supplied to the fault point in this case, a decision as to whether to carry out the trial power transmission or not is made by an operator of the distribution line.

EMBODIMENT 2

Although the foregoing embodiment 1 isolates the fault section using the computer system 73 which identifies the fault section and produces the control signal commanding closing of the load break switch 56, the fault section can be isolated by adding to the controller 91 of the feeder terminal units 63–68 a time limited sequential shift function.

More specifically, if a distribution line fault takes place in the section F1–3 of the distribution line F1 after the operation mode of the load break switches 56–58 is changed to the non-voltage open mode, for example, the fault section can be isolated as follows.

If a distribution line fault occurs in the section F1–3 of the distribution line F1 at time T1 as shown in FIG. 7, the protective relay attached to the feeder breaker 54 operates and trips the feeder breaker 54, and the distribution line F1 is shut down.

Thus, the load break switches 56–58 make a transition to the open state immediately in conjunction with the shut down of the distribution line F1 because their operation mode has been changed to the non-voltage open mode.

Then, the feeder breaker 54 automatically closes again at time T2 after a predetermined time (15 or 60 sec.) has passed since the distribution line F1 was opened. After an elapse of another predetermined time (7 or 10 sec.), the load break switch 56 is closed at time T3 under the command of the feeder terminal units 63, and the load break switch 57 is closed at time T4 after an elapse of still another predetermined time (7 or 10 sec.) under the command of the feeder terminal unit 64.

Thus, the sections F1–1, F1–2 and F1–3 are sequentially charged, in which case, since the fault section F1–3 is supplied with a voltage, the protective relay attached to the feeder breaker 54 operates again to trip the feeder breaker 54.

Accordingly, the once closed load break switch 56 is opened again because of the non-voltage state of the section F1–1. On the other hand, the load break switch 57, which is immediately opened again after being closed because of the tripping of the feeder breaker 54, has its closing locking mechanism operated because it becomes the non-voltage state in a time less than 80% of the closing time limit of 7 or 10 sec. Thus, the load break switch 57 makes a transition to a state in which automatic closing is not performed in spite of the charge on the power supply side.

Then, the feeder breaker 54 automatically closes again at time T6 after the predetermined time (15 or 60 sec.) has passed since the distribution line F1 was reopened. After an elapse of another predetermined time (7 or 10 sec.), the load break switch 56 is closed at time T7 under the command of the feeder terminal units 63. (The load break switch 57 is not closed automatically because its closing locking mechanism is in operation). In this way, the healthy sections F1–1 and F1–2 is charged and the outage is recovered.

After recovering the healthy sections F1–1 and F1–2, the computer system 73 supplies the substation remote terminal unit 70 with the control signal commanding closing of the tie switch 62 at time T8. Receiving the control signal, the substation remote terminal unit 70 transfers it to the feeder terminal unit 69 which closes the tie switch 62, thereby recovering the health section F1–4.

As described above, the present embodiment 2 is configured such that the feeder terminal units 63–65 execute the time limited sequential shift control of the load break switches 56–58 after the operation mode of the load break switches 56–58 has been changed from the non-voltage unopened mode to the non-voltage open mode. This offers an advantage of being able to isolate the fault section automatically, and to recover the outage of the healthy sections.

EMBODIMENT 3

Although the foregoing embodiment 2 handles a communication error between the feeder terminal unit 64 and the substation remote terminal unit 70, a communication error between the substation remote terminal unit 70 and the computer system 73 can also be dealt with. In this case, it is possible for the substation remote terminal unit 70 to supply, when it detects a communication error between the substation remote terminal unit 70 and the computer system 73, the feeder terminal units 63–68 with the command to change the mode to the non-voltage open mode.

This makes it possible to positively isolate the fault section as in the foregoing embodiment 2 even if a communication error takes place in the feeder terminal units 63–68, although open/close control of the load break switches 56–61 by the computer system 73 becomes impossible.

EMBODIMENT 4

Although the foregoing embodiment 2 handles a communication error between the feeder terminal unit 64 and the substation remote terminal unit 70, a communication error between the substation remote terminal unit 70 and computer system 73 can also be dealt with. In this case, the computer system 73 can notify an operator of the interruption of its distribution control. Thus, the operator can recognize that the load break switches 56–61 automatically isolate the fault section when a distribution fault occurs.

EMBODIMENT 5

Although the operation mode of the load break switches 56–58, which are controlled by the feeder terminal units 63–65 connected to the communication line A4, is changed from the non-voltage unopened mode to the non-voltage open mode if the communication error is detected between the feeder terminal unit 64 and the substation remote terminal unit 70 in the foregoing embodiments 1 and 2, the operation mode of the load break switches 59–61, which are controlled by the feeder terminal units 66–68 connected to the communication line A5, can also be changed from the non-voltage unopened mode to the non-voltage open mode, achieving a similar effect to that of embodiments 1 and 2.

What is claimed is:

1. A distribution control system comprising:

a plurality of switches interposed in a distribution line;

a plurality of arbitrators for monitoring a fault current flowing through said plurality of switches, for providing presence/absence information of the fault current, and for turning on and off said switches in response to a control signal;

a managing unit for identifying a fault section from the presence/absence information of the fault current, and for producing the control signal commanding opening of the switches interposed at opposite ends of the fault section; and means for detecting a communication fault between any one of said plurality of arbitrators and said managing unit, wherein each of said plurality of arbitrators changes an operation mode of one of said plurality of switches from a no-voltage unopened mode to a no-voltage open mode if the communication fault is detected.

2. The distribution control system as claimed in claim 1, wherein each one of said plurality of arbitrators changes, if information exchange with said managing unit becomes impossible, the operation mode of an associated one of said plurality of switches from the no-voltage unopened mode to the no-voltage open mode, and said managing unit supplies, if the information exchange with any one of said plurality of arbitrators becomes impossible, remaining ones of said plurality of arbitrators with a switching command switching the operation mode of the associated ones of said plurality of switches from no-voltage unopened mode to no-voltage open mode.

3. The distribution control system as claimed in claim 2, wherein each one of said plurality of arbitrators performs, when it changes the operation mode of the associated ones of said plurality of switches from the no-voltage unopened mode to the no-voltage open mode, time limited sequential shift control of the associated ones of said plurality of switches to place at least one of the switches associated with the fault section in a closed state.

4. The distribution control system as claimed in claim 3, wherein said managing unit comprises a substation remote terminal unit for carrying out information exchange with each of said plurality of arbitrators, and a control center for supplying said substation remote terminal unit with a command, and wherein said substation remote terminal unit supplies, if it detects a communication error between it and said control center, all of said plurality of arbitrators with the switching command switching the operation mode of the associated ones of said plurality of switches from the no-voltage unopened mode to the no-voltage open mode.

5. The distribution control system as claimed in claim 3, wherein said managing unit comprises a substation remote terminal unit for carrying out information exchange with each of said plurality of arbitrators, and a control center for supplying said substation remote terminal unit with a command, and wherein said control center notifies, when it detects a communication fault between it and said substation remote terminal unit, an operator of an interruption of distribution control of said control center.

6. The distribution control system as claimed in claim 1, wherein said managing unit supplies the switching command to an arbitrator connected to a communication line separate from a communication line connected to the arbitrator that cannot exchange the information.

7. The distribution control system as claimed in claim 1, wherein each of said switches interposed in said distribution line is a switch that changes its operation mode from the no-voltage unopened mode to the no-voltage open mode in response to a mode switching request from one of said plurality of arbitrators.

8. A distribution control method comprising the steps of:
monitoring, for a plurality of feeder terminal units, a fault current passing through a plurality of switches interposed in a distribution line;
providing a managing center with presence/absence information about the fault current;
providing, when said managing center identifies a fault section from the presence/absence information about the fault current, feeder terminal units at both ends of the fault section with a control signal commanding opening of the switches at opposite ends of the fault section; and
changing, for each of said plurality of feeder terminal units, an operation mode of each of said plurality of switches from a no-voltage unopened mode to a no-voltage open mode if a communication fault is detected between any one of said plurality of feeder terminal units and said managing center.

9. The distribution control method as claimed in claim 8, wherein changing comprises:
changing, for each of said plurality of feeder terminal units, if information exchange between it and said managing center becomes impossible, the operation mode of an associated one of said plurality of switches from the no-voltage unopened mode to the no-voltage open mode; and
supplying, from said managing center, if the information exchange between it and any one of said plurality of feeder terminal units becomes impossible, remaining ones of said plurality of feeder terminal units with a switching command, switching the operation mode of their associated ones of said plurality of switches from no-voltage unopened mode to no-voltage open mode.

10. The distribution control method as claimed in claim 9, wherein changing comprises performing, for each one of said plurality of feeder terminal units, when it changes the operation mode of the associated one of said plurality of switches from the no-voltage unopened mode to the no-voltage open mode, time limited sequential shift control of the associated one of said plurality of switches to place at least one of the switches associated with the fault section in a closed state.

11. The distribution control method as claimed in claim 10, wherein changing comprises, when said managing center comprises a substation remote terminal unit for carrying out information exchange with each of said plurality of feeder terminal units and a control center for supplying said substation remote terminal unit with a command, supplying, from said substation remote terminal unit to all of said plurality of feeder terminal units, if said substation remote terminal unit detects a communication error between it and said control center, a switching command to switch the operation mode of their associated ones of said plurality of switches from the no-voltage unopened mode to the no-voltage open mode.

12. The distribution control method as claimed in claim 10, further comprising, when said managing center comprises a substation remote terminal unit for carrying out information exchange with each of said plurality of feeder terminal units and a control center for supplying said substation remote terminal unit with a command, providing an operator, when said control center detects a communication fault between it and said substation remote terminal unit, with information about an interruption of distribution control of said control center.

13. The distribution control method as claimed in claim 8, further comprising supplying the switching command to feeder terminal units connected to a communication line separate from a communication line connected to the feeder terminal unit that cannot exchange the information.

14. The distribution control method as claimed in claim 8, wherein each of said switches interposed in said distribution line is a switch that changes its operation mode from the no-voltage unopened mode to the no-voltage open mode in response to a mode switching request from one of said plurality of feeder terminal units.

* * * * *